(12) United States Patent
Bhai

(10) Patent No.: US 7,953,537 B2
(45) Date of Patent: May 31, 2011

(54) ALGORITHM FOR POWER DRIVE SPEED CONTROL

(75) Inventor: Aziz A. Bhai, West Chester, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 551 days.

(21) Appl. No.: 12/040,446

(22) Filed: Feb. 29, 2008

(65) Prior Publication Data

US 2009/0222184 A1    Sep. 3, 2009

(51) Int. Cl.
*G06F 19/00* (2011.01)
(52) U.S. Cl. .............................. 701/70; 701/79; 5/81.1 R
(58) Field of Classification Search .................... 701/33, 701/36, 70, 79; 180/293, 276; 5/617, 618, 5/81.1 R
See application file for complete search history.

(56) References Cited

U.S. PATENT DOCUMENTS

| | | |
|---|---|---|
| 813,213 A | 2/1906 | Johnson |
| 1,110,838 A | 9/1914 | Taylor |
| 1,118,931 A | 12/1914 | Hasley |
| 1,598,124 A | 8/1926 | Evans |
| 1,639,801 A | 8/1927 | Heise |
| 1,778,698 A | 10/1930 | Walter |
| 2,224,087 A | 12/1940 | Reichert |
| 2,599,717 A | 6/1952 | Menzies |
| 2,635,899 A | 4/1953 | Osbon, Jr. |
| 2,999,555 A | 9/1961 | Stroud et al. |
| 3,004,768 A | 10/1961 | Klages |
| 3,112,001 A | 11/1963 | Wise |
| 3,304,116 A | 2/1967 | Stryker |
| 3,305,876 A | 2/1967 | Hutt |
| 3,380,546 A | 4/1968 | Rabjohn |
| 3,393,004 A | 7/1968 | Williams |
| 3,404,746 A | 10/1968 | Slay |
| 3,452,371 A | 7/1969 | Hirsch |
| 3,544,127 A | 12/1970 | Dobson |
| 3,618,966 A | 11/1971 | Vandervest |
| 3,680,880 A | 8/1972 | Blaauw |
| 3,770,070 A | 11/1973 | Smith |
| 3,802,524 A | 4/1974 | Seidel |
| 3,814,199 A | 6/1974 | Jones |
| 3,820,838 A | 6/1974 | Limpach |
| 3,869,011 A | 3/1975 | Jensen |
| 3,872,945 A | 3/1975 | Hickman et al. |

(Continued)

FOREIGN PATENT DOCUMENTS

CA    2010543    9/1990

(Continued)

OTHER PUBLICATIONS

European search report from EP 0925 0422 dated Feb. 19, 2010.

(Continued)

*Primary Examiner* — Gertrude Arthur Jeanglaud
(74) *Attorney, Agent, or Firm* — Barnes & Thornburg LLP

(57) ABSTRACT

A control system for a self-propelled patient-support apparatus includes a controller that utilizes a power drive speed control algorithm to control the power output to a motor of a drive mechanism for driving the patient-support apparatus across a floor. The control algorithm normalizes a force input by a user on a user input device, the force indicative of a desired drive speed. The algorithm varies the responsiveness of the output to the drive mechanism based on the current operating conditions of the drive mechanism.

21 Claims, 8 Drawing Sheets

U.S. PATENT DOCUMENTS

| | | |
|---|---|---|
| 3,876,024 A | 4/1975 | Shieman et al. |
| 3,938,608 A | 2/1976 | Folco-Zambelli |
| 4,137,984 A | 2/1979 | Jennings et al. |
| 4,164,355 A | 8/1979 | Eaton et al. |
| 4,167,221 A | 9/1979 | Edmonson et al. |
| 4,175,632 A | 11/1979 | Lassanske |
| 4,175,783 A | 11/1979 | Pioth |
| 4,221,273 A | 9/1980 | Finden |
| 4,274,503 A | 6/1981 | Mackintosh |
| 4,275,797 A | 6/1981 | Johnson |
| 4,415,049 A | 11/1983 | Wereb |
| 4,415,050 A | 11/1983 | Nishida et al. |
| 4,439,879 A | 4/1984 | Werner |
| 4,444,284 A | 4/1984 | Montemurro |
| 4,475,611 A | 10/1984 | Fisher |
| 4,475,613 A | 10/1984 | Walker |
| 4,511,825 A | 4/1985 | Klimo |
| 4,513,832 A | 4/1985 | Engman |
| 4,566,707 A | 1/1986 | Nitzberg |
| 4,584,989 A | 4/1986 | Stith |
| 4,614,246 A | 9/1986 | Masse et al. |
| 4,629,242 A | 12/1986 | Schrager |
| 4,646,860 A | 3/1987 | Owens et al. |
| 4,723,808 A | 2/1988 | Hines |
| 4,724,555 A | 2/1988 | Poehner et al. |
| 4,759,418 A | 7/1988 | Goldenfeld et al. |
| 4,771,840 A | 9/1988 | Keller |
| 4,807,716 A | 2/1989 | Hawkins |
| 4,811,988 A | 3/1989 | Immel |
| 4,848,504 A | 7/1989 | Olson |
| 4,874,055 A | 10/1989 | Beer |
| 4,895,040 A | 1/1990 | Soederberg |
| 4,922,574 A | 5/1990 | Heiligenthal et al. |
| 4,938,493 A | 7/1990 | Okuda |
| 4,949,408 A | 8/1990 | Trkla |
| 4,979,582 A | 12/1990 | Forster |
| 4,981,309 A | 1/1991 | Froeschle et al. |
| 5,060,327 A | 10/1991 | Celestina et al. |
| 5,060,959 A | 10/1991 | Davis et al. |
| 5,069,465 A | 12/1991 | Stryker et al. |
| 5,083,625 A | 1/1992 | Bleicher |
| 5,084,922 A | 2/1992 | Louit |
| 5,094,314 A | 3/1992 | Hayata |
| 5,117,521 A | 6/1992 | Foster et al. |
| 5,121,806 A | 6/1992 | Johnson |
| 5,156,226 A | 10/1992 | Boyer et al. |
| 5,181,762 A | 1/1993 | Beumer |
| 5,187,824 A | 2/1993 | Stryker |
| 5,193,633 A | 3/1993 | Ezenwa |
| 5,201,819 A | 4/1993 | Shiraishi et al. |
| 5,222,567 A | 6/1993 | Broadhead et al. |
| 5,232,065 A | 8/1993 | Cotton |
| 5,244,225 A | 9/1993 | Frycek |
| 5,251,429 A | 10/1993 | Minato et al. |
| 5,255,403 A | 10/1993 | Ortiz |
| 5,279,010 A | 1/1994 | Ferrand et al. |
| 5,284,218 A | 2/1994 | Rusher, Jr. |
| 5,293,950 A | 3/1994 | Marliac |
| 5,307,889 A | 5/1994 | Bohannan |
| 5,322,306 A | 6/1994 | Coleman |
| 5,337,845 A | 8/1994 | Foster et al. |
| 5,348,326 A | 9/1994 | Fullenkamp et al. |
| 5,358,265 A | 10/1994 | Yaple |
| 5,366,036 A | 11/1994 | Perry |
| 5,381,572 A | 1/1995 | Park |
| 5,388,294 A | 2/1995 | Reeder |
| 5,406,778 A | 4/1995 | Lamb et al. |
| 5,439,069 A | 8/1995 | Beeler |
| 5,445,233 A | 8/1995 | Fernie et al. |
| 5,447,317 A | 9/1995 | Gehlsen et al. |
| 5,447,935 A | 9/1995 | Hubele et al. |
| 5,450,639 A | 9/1995 | Weismiller et al. |
| 5,477,935 A | 12/1995 | Chen |
| 5,487,437 A | 1/1996 | Avitan |
| 5,495,904 A | 3/1996 | Zwaan et al. |
| 5,526,890 A | 6/1996 | Kadowaki |
| 5,531,030 A | 7/1996 | Dale, Jr. |
| 5,535,465 A | 7/1996 | Hannant |
| 5,542,690 A | 8/1996 | Kozicki |
| 5,562,091 A | 10/1996 | Foster et al. |
| 5,570,483 A | 11/1996 | Williamson |
| 5,580,207 A | 12/1996 | Kiebooms et al. |
| 5,613,252 A | 3/1997 | Yu et al. |
| 5,669,086 A | 9/1997 | Garman |
| 5,687,437 A | 11/1997 | Goldsmith |
| 5,690,185 A | 11/1997 | Sengel |
| 5,697,623 A | 12/1997 | Bermes et al. |
| 5,737,782 A | 4/1998 | Matsuura et al. |
| 5,749,424 A | 5/1998 | Reimers |
| 5,775,456 A | 7/1998 | Reppas |
| 5,778,996 A | 7/1998 | Prior et al. |
| 5,806,111 A | 9/1998 | Heimbrock et al. |
| 5,809,755 A | 9/1998 | Velke et al. |
| 5,826,670 A | 10/1998 | Nan |
| 5,839,528 A | 11/1998 | Lee |
| 5,906,017 A | 5/1999 | Ferrand et al. |
| 5,915,487 A | 6/1999 | Splittstoesser et al. |
| 5,921,338 A | 7/1999 | Edmondson |
| 5,927,414 A | 7/1999 | Kan et al. |
| 5,934,694 A | 8/1999 | Schugt et al. |
| 5,937,959 A | 8/1999 | Fujii et al. |
| 5,937,961 A | 8/1999 | Davidson |
| 5,944,131 A | 8/1999 | Schaffner et al. |
| 5,964,313 A | 10/1999 | Guy |
| 5,964,473 A | 10/1999 | Degonda et al. |
| 5,971,091 A | 10/1999 | Kamen et al. |
| 5,983,425 A | 11/1999 | DiMucci et al. |
| 5,987,671 A | 11/1999 | Heimbrock et al. |
| 5,988,304 A | 11/1999 | Behrendts |
| 5,996,149 A | 12/1999 | Heimbrock et al. |
| 6,000,486 A | 12/1999 | Romick et al. |
| 6,016,580 A | 1/2000 | Heimbrock et al. |
| 6,035,561 A | 3/2000 | Paytas et al. |
| 6,050,356 A | 4/2000 | Takeda et al. |
| 6,059,060 A | 5/2000 | Kanno et al. |
| 6,059,301 A | 5/2000 | Skarnulis |
| 6,062,328 A | 5/2000 | Campbell et al. |
| 6,065,555 A | 5/2000 | Yuki et al. |
| 6,070,679 A | 6/2000 | Berg et al. |
| 6,073,285 A | 6/2000 | Ambach et al. |
| 6,076,208 A | 6/2000 | Heimbrock et al. |
| 6,076,209 A | 6/2000 | Paul |
| 6,098,732 A | 8/2000 | Romick et al. |
| 6,105,348 A | 8/2000 | Turk et al. |
| 6,125,957 A | 10/2000 | Kauffmann |
| 6,131,690 A | 10/2000 | Galando et al. |
| 6,148,942 A | 11/2000 | Mackert, Sr. |
| 6,154,690 A | 11/2000 | Coleman |
| 6,173,799 B1 | 1/2001 | Miyazaki et al. |
| 6,178,575 B1 | 1/2001 | Harada |
| 6,179,074 B1 | 1/2001 | Scharf |
| 6,209,670 B1 | 4/2001 | Fernie et al. |
| 6,256,812 B1 | 7/2001 | Bartow et al. |
| 6,286,165 B1 | 9/2001 | Heimbrock et al. |
| 6,330,926 B1 | 12/2001 | Heimbrock et al. |
| 6,343,665 B1 | 2/2002 | Eberlein et al. |
| 6,474,434 B1 | 11/2002 | Bech |
| 6,505,359 B2 | 1/2003 | Heimbrock et al. |
| 6,668,402 B2 | 12/2003 | Heimbrock |
| 6,668,965 B2 | 12/2003 | Strong |
| 6,725,956 B1 | 4/2004 | Lemire |
| 6,749,034 B2 | 6/2004 | Vogel et al. |
| 6,752,224 B2 | 6/2004 | Hopper et al. |
| 6,772,850 B1 | 8/2004 | Waters et al. |
| 6,877,572 B2 | 4/2005 | Vogel et al. |
| 6,945,697 B2 | 9/2005 | Schuster |
| 7,011,172 B2 | 3/2006 | Heimbrock et al. |
| 7,014,000 B2 | 3/2006 | Kummer et al. |
| 7,083,012 B2 | 8/2006 | Vogel et al. |
| 7,090,041 B2 | 8/2006 | Vogel et al. |
| 7,195,253 B2 | 3/2007 | Vogel et al. |
| 7,273,115 B2 | 9/2007 | Kummer et al. |
| 7,284,626 B2 | 10/2007 | Heimbrock et al. |
| 2002/0138905 A1 | 10/2002 | Bartlett et al. |
| 2002/0152555 A1 | 10/2002 | Gallant et al. |
| 2003/0163226 A1 | 8/2003 | Tan |
| 2004/0133982 A1 | 7/2004 | Horitani et al. |

| | | | |
|---|---|---|---|
| 2005/0199430 A1 | 9/2005 | Vogel et al. | |
| 2006/0059623 A1 | 3/2006 | Karmer, Jr. et al. | |
| 2007/0163043 A1* | 7/2007 | Lemire et al. ................ 5/600 | |

FOREIGN PATENT DOCUMENTS

| | | |
|---|---|---|
| CA | 2294761 | 1/1999 |
| CA | 2589811 | 6/2006 |
| DE | 1 041 210 | 10/1958 |
| DE | 94 20 429 | 12/1994 |
| DE | 295 18 502 UI | 1/1997 |
| DE | 199 21 503 | 4/2000 |
| EP | 0 062 180 A2 | 10/1982 |
| EP | 0 093 700 A2 | 11/1983 |
| EP | 0 204 637 A1 | 12/1986 |
| EP | 0 329 504 B1 | 8/1989 |
| EP | 0 352 647 B1 | 1/1990 |
| EP | 0 403 202 B1 | 12/1990 |
| EP | 0 420 263 A1 | 4/1991 |
| EP | 0 630 637 A1 | 12/1994 |
| EP | 0 653 341 A1 | 5/1995 |
| EP | 0 776 637 A1 | 6/1997 |
| EP | 0 776 648 A1 | 6/1997 |
| EP | 0 967 535 A1 | 12/1999 |
| EP | 991529 B1 | 4/2000 |
| FR | 2 714 008 | 6/1995 |
| FR | 2 735 019 | 12/1996 |
| FR | 2 746 060 | 9/1997 |
| GB | 415450 | 8/1934 |
| GB | 672557 | 5/1952 |
| GB | 1 601 930 | 11/1981 |
| GB | 2 285 393 A | 7/1995 |
| JP | 46-31490 | 9/1971 |
| JP | 47-814 | 8/1972 |
| JP | 47-17495 | 10/1972 |
| JP | 47-44792 | 6/1973 |
| JP | 48-44792 | 6/1973 |
| JP | 48-44793 | 6/1973 |
| JP | 48-54494 | 7/1973 |
| JP | 48-54495 | 7/1973 |
| JP | 49-29855 | 3/1974 |
| JP | 51-20491 | 2/1976 |
| JP | 53-9091 | 1/1978 |
| JP | 53-96397 | 8/1978 |
| JP | 56-68523 | 6/1981 |
| JP | 56-68524 | 6/1981 |
| JP | 56-73822 | 6/1981 |
| JP | 57-157325 | 10/1982 |
| JP | 57-187521 | 11/1982 |
| JP | 58 06357 | 4/1983 |
| JP | 59-37946 | 3/1984 |
| JP | 59-38176 | 3/1984 |
| JP | 59-183756 | 10/1984 |
| JP | 59-186554 | 10/1984 |
| JP | 60-12058 | 1/1985 |
| JP | 60-12059 | 1/1985 |
| JP | 60-21751 | 2/1985 |
| JP | 60-31749 | 2/1985 |
| JP | 60-31750 | 2/1985 |
| JP | 60-31751 | 2/1985 |
| JP | 60-122561 | 7/1985 |
| JP | 60-188152 | 9/1985 |
| JP | 60-188153 | 9/1985 |
| JP | 61 88727 | 8/1986 |
| JP | 61-188727 | 11/1986 |
| JP | 62-60433 | 4/1987 |
| JP | 64-17231 | 1/1989 |
| JP | 2-84961 | 3/1990 |
| JP | 3-31063 | 2/1991 |
| JP | 4-108525 | 9/1992 |
| JP | 6-50631 | 7/1994 |
| JP | 6-237959 | 8/1994 |
| JP | 7-136215 | 5/1995 |
| JP | 7 328074 | 12/1995 |
| JP | 8-112244 | 5/1996 |
| JP | 8-317953 | 12/1996 |
| JP | 9-24071 | 1/1997 |
| JP | 9-38154 | 2/1997 |
| JP | 9-38155 | 2/1997 |
| JP | 10-146364 | 6/1998 |
| JP | 10-181609 | 7/1998 |
| JP | 10-305705 | 11/1998 |
| JP | 200-118407 | 4/2000 |
| JP | 2000-107230 | 4/2000 |
| JP | 2000-175974 | 6/2000 |
| WO | WO 82-01313 | 4/1982 |
| WO | WO 87/07830 | 12/1987 |
| WO | WO 94/16935 | 8/1994 |
| WO | WO 94/21505 | 9/1994 |
| WO | WO 95/20514 | 8/1995 |
| WO | WO 96/07555 | 3/1996 |
| WO | WO 96/33900 | 10/1996 |
| WO | WO 97/39715 | 10/1997 |
| WO | WO 99/01298 | 1/1999 |
| WO | WO 00/37222 | 6/2000 |
| WO | WO 00/51830 | 8/2000 |
| WO | WO 01/19313 | 3/2001 |
| WO | WO 01/85084 | 11/2001 |
| WO | WO 2005/028243 | 3/2005 |
| WO | WO 2005/068276 A1 | 7/2005 |
| WO | WO 2006/059200 A2 | 6/2006 |

OTHER PUBLICATIONS

Stryker Medical, 2040 Zoom™ Critical Care Bed Maintenance Manual, date unknown.
Motorvator 3 Product Features Webpage, May 10, 2000.
Stryker Corporation Zoom™ drive brochure, Mar. 2000.
Midmark 530 Stretcher Information, Midmark Catalog, p. 14.
Tri-Flex II by Burke, Inc., "Operation Manual Impulse Drive System," (2004).

* cited by examiner

ALGORITHM FOR POWER DRIVE SPEED CONTROL

BACKGROUND OF THE INVENTION

The present disclosure is related to a control system for a power drive speed control for a self-propelled patient-support apparatus.

In a clinical environment such as a hospital, for example, the use of self-propelled patient-support apparatuses helps reduce the potential for injury to caregivers by limiting the amount of force required to move a patient-support apparatus throughout the hospital. Such apparatuses include a drive mechanism employing a motorized wheel or track which deploys from a frame to contact the floor. When not in use, the drive mechanism is stowed within the confines of the frame. Activation of the drive mechanism causes the drive mechanism to lower until the wheel or track contacts the floor. Operation of the drive mechanism is controlled by a user from a user interface positioned at a head end or foot end of the patient-support apparatus. The input to the drive motor can be a discrete input such as a momentary switch which causes the drive mechanism to operate at a particular speed/power level. It is a also known to use a variable input which is responsive to an input forced by the user to vary the speed of the patient-support apparatus based on the deflection of the input.

In the case of the momentary switch type input, it is necessary for the designer of the drive mechanism to develop a power level which is acceptable over all ranges of use of the patient-support apparatus. If the load on the patient-support apparatus is greater, the speed at which the drive mechanism is able to drive the patient-support apparatus is limited based on the load. However, this type of motor control is relatively simple to employ.

In the case of the variable-type input, the motor/power control system must be responsive to the variable input to increase or decrease the speed at which the drive mechanism drives the patient-support apparatus. In some cases, the variable input requires a user to push again push handles on the patient-support apparatus to cause the drive mechanism to propel the patient-support apparatus. As the patient-support apparatus moves away from the user, the user must walk at a speed which matches the desired speed of the patient-support apparatus in order to maintain a constant input into the variable-type input. Variations in the speed of the user as compared to the patient-support apparatus tend to cause the user to have difficulty in maintaining a constant input to the variable-type input, thereby causing variations in to the input of the control system and may cause the patient-support apparatus to lurch when the variable input is erratically applied by the user.

SUMMARY OF THE INVENTION

The present disclosure comprises one or more of the features recited in the appended claims and/or the following features which, alone or in any combination, may comprise patentable subject matter:

A patient-support apparatus comprises a frame, a drive mechanism coupled to the frame and configured to move the patient-support apparatus across the floor. The drive mechanism includes a drive wheel and a motor to drive the wheel. The patient-support apparatus further comprises a controller coupled to the drive motor and a user input coupled to the controller. The user input is configured to provide an input indicative of the speed and direction a user wishes to move the patient-support apparatus.

In some embodiments, the controller includes a processor and a memory device including instructions that, when executed by the processor monitor the user input device to determine a speed input request from a user. The instructions may also determine the desired direction of the movement of the patient-support apparatus across the floor. The instructions may also normalize the speed input request to adjust for load cell responses. If the normalized speed input request exceeds a threshold value the instructions may calculate an effective speed input value by evaluating a current speed input request and a previous speed output value. The instructions may apply a speed transfer function to the effective input to determine a current raw speed output value. The instructions may then scale the current raw speed output value based on the direction of desired movement. Once the scaled speed is determined, the instructions may weigh the current scaled speed output with the previous speed output value to determine a current speed output value to transmit to the motor.

In some embodiments, the drive mechanism further includes a motor controller configured to receive the current speed output value and to power the motor based on the current speed output value. In some embodiments, the memory device further includes instructions that normalize the speed input request based on the direction of travel of the patient-support apparatus.

In some embodiments, the memory device further includes instructions that normalize the speed input based on the value of the speed input request compared to a value of a previous speed input request. In some embodiments, the memory device further includes instructions that normalize the speed input based on the value of the speed input request as compared to a condition in which there is no speed input request. In some embodiments, the memory device further includes instructions that apply a strain gage constant to normalize the speed value request.

In some embodiments, the speed transfer function may vary over time. In some embodiments, the speed transfer function is calculated based on the normalized speed input request and a previous speed output value. In some embodiments, the memory device further includes instructions that vary the speed transfer function if the normalized input exceeds a transfer function change threshold.

In some embodiments, the scaling of the speed is based on the intended use environment of the particular patient-support apparatus. In some embodiments, the weighting of the current scaled output speed value decreases as the value of the previous speed output value increases.

In some embodiments, the user input device comprises a load cell. In some embodiments, the user input device comprises a plurality of load cells. In some embodiments, the load cell is deflected by a push handle. In some embodiments, the user input device comprises an enable switch. In some embodiments, the ratio of the weighting of the current scaled output speed value to the value of the previous speed output value varies from 1:5 to 1:13. In some embodiments, the motor is a DC motor.

In another aspect of the present disclosure, a method of controlling the speed and direction of travel of a self-propelled patient-support apparatus includes a variable user input configure to receive a user input indicative of the direction and speed of travel, comprises the method steps of monitoring the user input device to determine a speed input request from a user, and providing a speed output value. The method may further comprise the step of determining the desired direction of the movement of the patient-support apparatus.

The method may further comprise the step of normalizing the speed input request.

The method may further comprise the step of comparing the normalized speed input request to a threshold value.

The method may further comprise the step of calculating an effective speed input value by evaluating a current speed input request and a previous speed output value.

The method may further comprise the step of applying a speed transfer function to the effective input to determine a current raw speed output value The method may further comprise the step of scaling the current raw speed output value based on the direction of desired movement The method may further comprise the step of weighting the current scaled speed output with the previous speed output value to determine a current speed output value to transmit to the motor.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
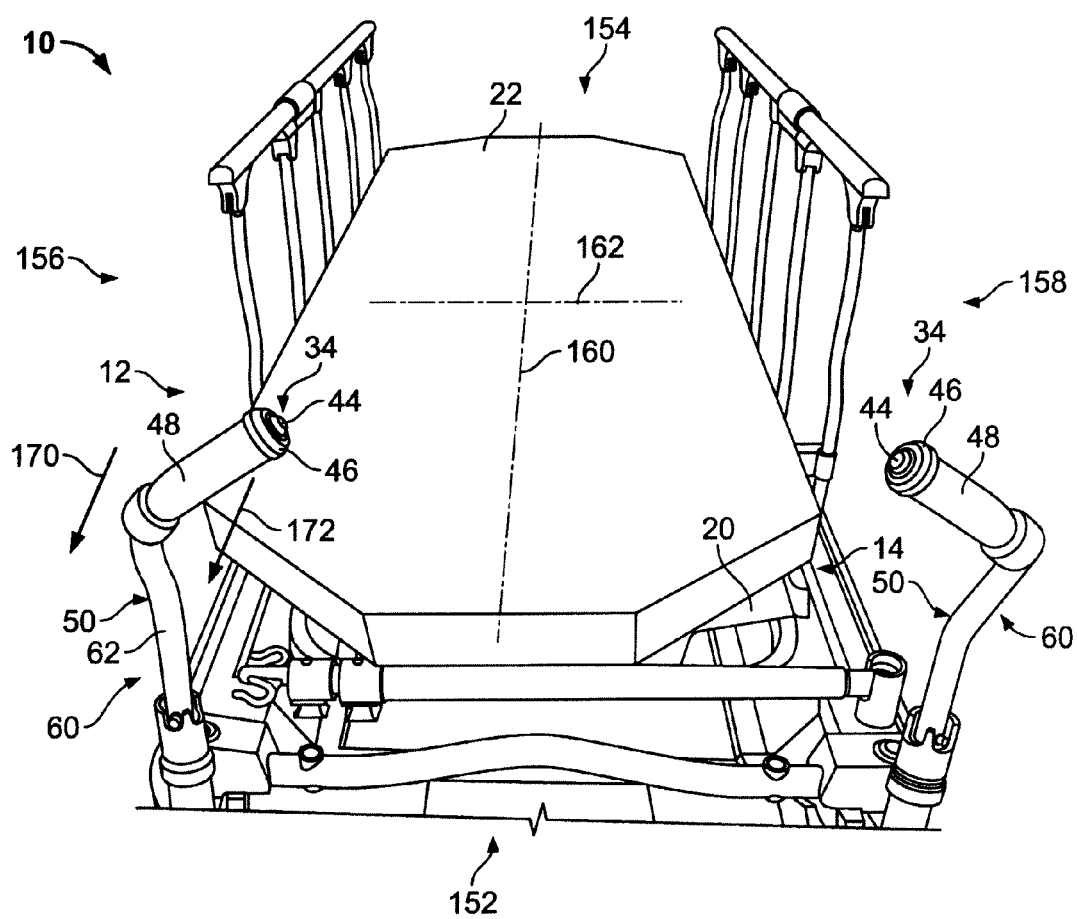
FIG. 1 is a partial perspective view of a self-propelled stretcher including a drive mechanism employing an algorithm for power drive speed control according to the present disclosure.
Figure 2:
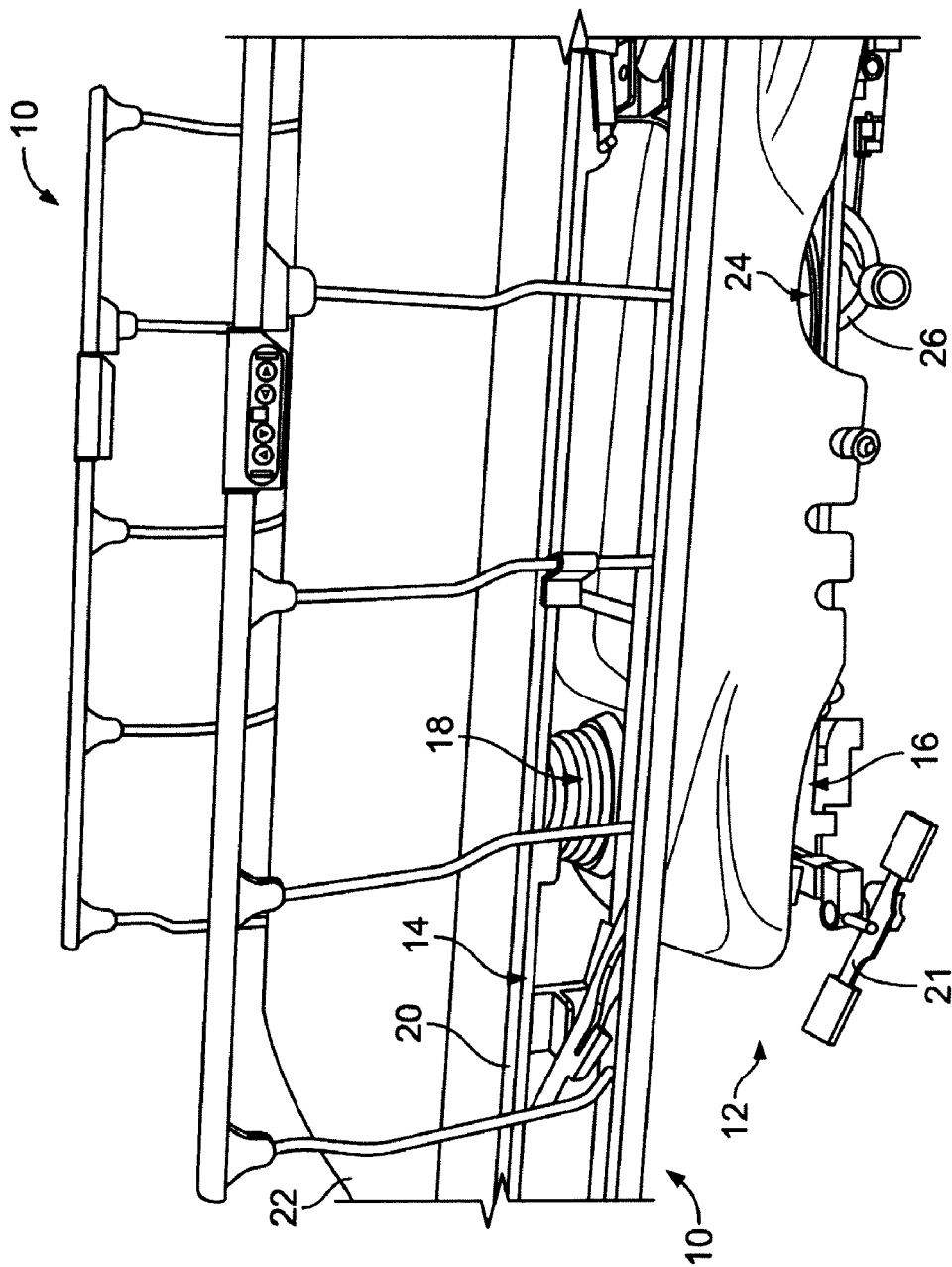
FIG. 2 is a partial perspective side view of the stretcher of FIG. 1, the stretcher having a deployable drive mechanism located under a lower base shroud of the stretcher.
Figure 4:
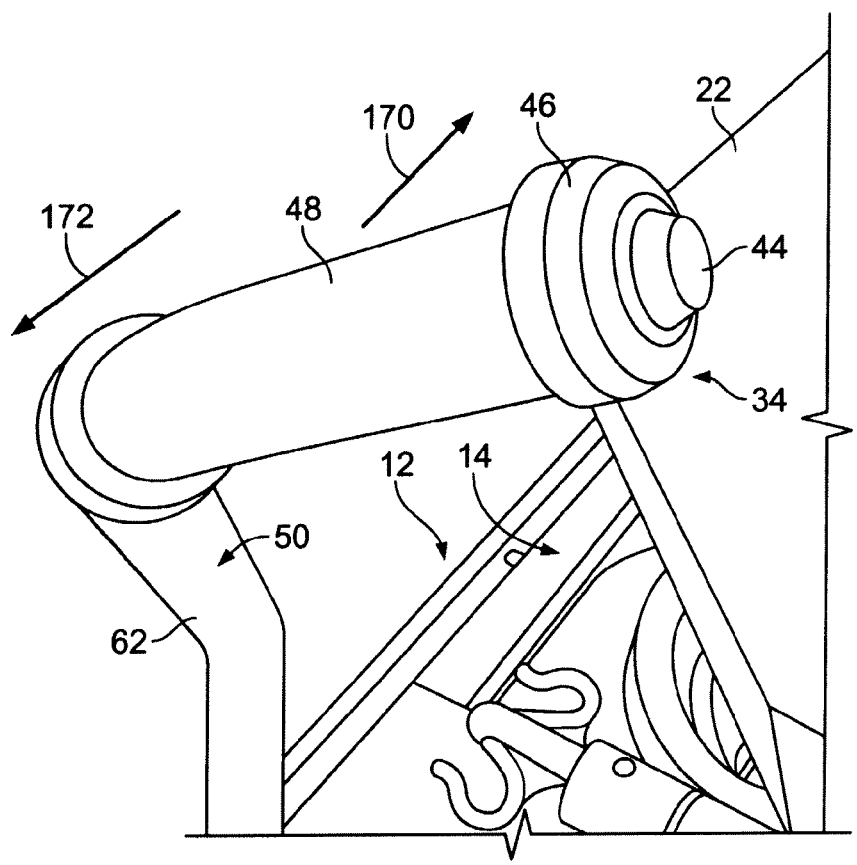
FIG. 4 is an enlarged view of an input handle of the stretcher shown in FIG. 1.
Figure 5:
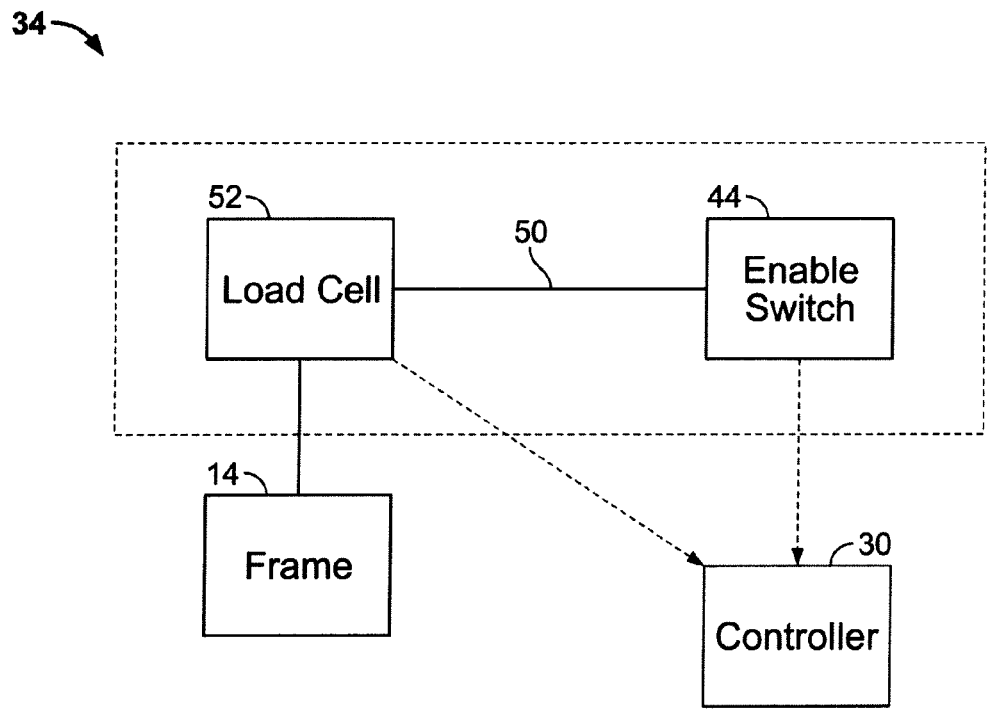
FIG. 5 is a block diagram of a user interface assembly of the stretcher of FIG. 1.

As shown in FIGS. 1-2 and 4, a patient support apparatus 10, illustratively embodied as a stretcher, includes a frame 12 which has an upper frame 14 and a base frame or lower frame 16 (best seen in FIG. 2). The lower frame 16 supports two elevation adjustment mechanisms 18 that are operable to raise, lower, and tilt upper frame 14 relative to the lower frame 16. A patient support 20, such an articulating deck, is coupled to upper frame 14. A mattress 22 is carried by patient support 20. A plurality of casters (not shown) are coupled to base frame 16 and are in contact with the underlying floor. The casters include braking mechanisms (not shown) which are well known in the art and apparatus 10 has a set of brake/steer pedals 21 which are movable to brake and unbrake the casters via manipulation of the associated caster braking mechanisms. The apparatus 10 has a head end 152, a foot end 154, a left side 156, a right side 158, a longitudinal axis 160, and a transverse or lateral axis 162 as shown in FIG. 2.

Referring now to FIG. 2, a drive mechanism 24 is coupled to base frame 16 and includes a wheel 26 that is motor driven to propel apparatus 10 along a floor. In one embodiment, device 24 is of the type available from Borringia Industries AG of Ettingen, Switzerland, one version of which is marketed as the COMPASS™ drive. Such a device 24, therefore, may be constructed in accordance with the teachings of PCT Patent Application No. PCT Publication No. WO 2006/059200 A2 which is hereby incorporated by reference herein and which has a motor driven wheel 26 that can be raised out of contract with the floor, lowered into contact with the floor, and swiveled by ninety degrees between a first orientation in which apparatus 10 is propelled in the longitudinal direction (i.e., parallel with the longitudinal or long dimension 160 of frame 12) and a second orientation in which apparatus 10 is propelled side-to-side or in the lateral direction (i.e., parallel with the lateral or short dimension 162 of frame 12).

Figure 3:
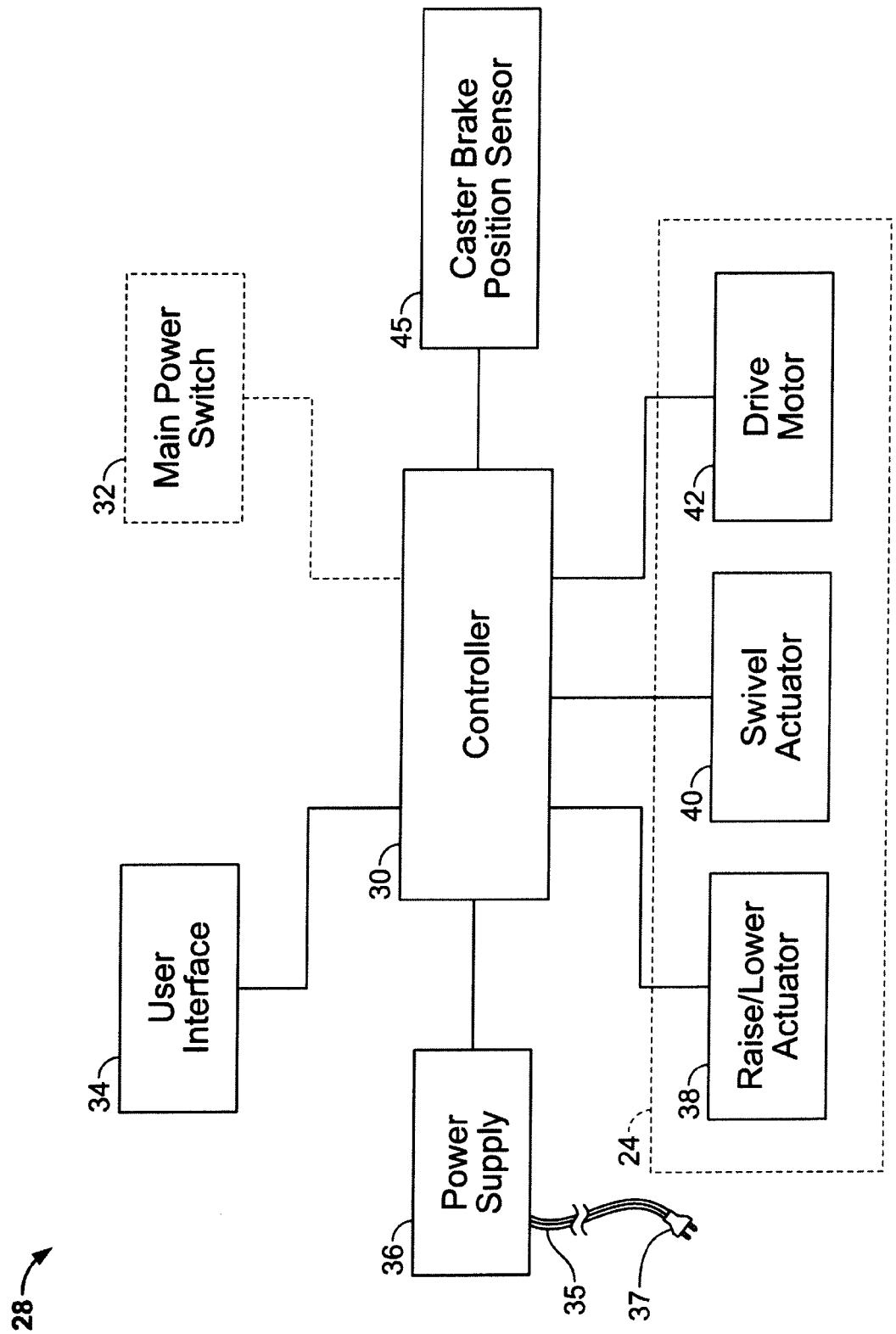
FIG. 3 is a block diagram of the control system of the stretcher of FIG. 1.

An electrical system 28 of apparatus 10 shown in FIG. 3, includes a controller 30 and an optional main power switch 32. The electrical system 28 also includes one or more user interfaces 34 and a power supply 36. The electrical system 28 also includes raise/lower actuator 38, a swivel actuator 40, and a drive motor 42 which are all housed in the drive mechanism 24. The electrical system 28 further includes a caster brake position sensor 44. The various components of the electrical system 28 are coupled to the controller 30. Controller 30 comprises logic-based circuitry such as a microprocessor, a microcontroller, a field programmable gate array, or even discrete logic gates or the like, along with all associated circuitry such as memory, analog-to-digital converters, digital-to-analog converters, input/output circuitry and so on. The circuitry of controller 30 may be located on a plurality of circuit boards or be included in various modules that couple together. For example, controller 30 may include a logic controller portion which receives input signals regarding various conditions of apparatus 10 and a drive controller portion that is coupled to the logic controller portion and that controls voltage and/or current application to motor 42 and actuators 38, 40 of system 28 in response to an output signal received from the logic controller portion. In those embodiments having main power switch 32, switch 32 is used to turn the transport device 24 on and off. In those embodiments without main power switch 32, then transport device may be on continually, although the system may power down into a sleep mode after a period of inactivity. In some embodiments, when off or when in the sleep mode, transport device 24 may have wheel 26 in a raised position spaced from the underlying floor.

As shown in FIG. 4, the one or more user interfaces 34 include user inputs, as will be further described below, that are engaged by a user to signal controller 30 as to the manner in which transport device 24 is to be operated. Power supply 36 comprises a battery, battery recharging circuitry, an AC power cord 35 having an AC power plug 37, AC-to-DC conversion circuitry and other circuit components involved in powering the remainder of system 28. Actuator 38 is operable in response to command signals from controller 30 to raise wheel 26 off of the underlying floor and to lower wheel 26 into contact with the floor. Actuator 40 is operable in response to command signals from controller 30 to swivel wheel 26 between the first and second orientations. Drive motor 42 is operable in response to command signals from controller 30 to rotate wheel 26 thereby to propel apparatus 10 along the floor.

Assuming controller 30 receives signals from user interface 34 indicating that a user desires powered transport of apparatus 10, controller 30 determines whether other conditions are met prior to activating motor 42 to drive wheel 26. For example, controller 30 may first determine that battery power of power supply 36 meets or exceeds a threshold level and may also determine whether the casters are unbraked before applying power to drive motor 42 to rotate wheel 26. A caster brake position sensor 45 provides a signal to controller regarding whether casters are braked or unbraked. Contrary to the teachings of all known prior art patient support apparatuses that have powered transport systems and that have AC power plugs, controller 30 does not require that the power plug of power supply 36 of apparatus 10 be unplugged prior to applying power to drive motor 42 to rotate wheel 26 to propel apparatus 10 along the floor. This creates the possibility that apparatus 10 can be power driven with the power plug still plugged into an electrical outlet resulting in the power plug being ripped out of the electrical outlet as apparatus 10 is driven away. However, by allowing motor 42 to be driven even when the AC power plug is plugged into an electrical outlet, drive mechanism 24 can be used to make minor adjustments in the positioning of apparatus within its location. This is especially useful when obese or morbidly obese (also known as, bariatric) patients are supported on apparatus 10.

User interface 34 at the head end of apparatus 10 includes a pair of first switches 44, shown in FIGS. 1 and 4, that extend from distal ends 46 of hand grip portions 48 of respective push handles 50 that are coupled to upper frame 14. Switches 44 must be activated to enable the drive mechanism 24 to operate to drive the motor 42. User interface 34 at the head end of apparatus 10 further includes a load cell 52 that is situated within an interior region of the associated push handle 50 as is known in the art.

A user applies a force to handle 48 by pushing on the handle 48 in the direction of arrow 170 or pulling on the handle in the direction of arrow 172. Load cell 52 is fixed to frame 14. Movement of handle 50 acts on load cell 52 causing deflection of load cell 52 which is sensed by a strain gage in load cell 52, as is well known in the art.

Figure 6:
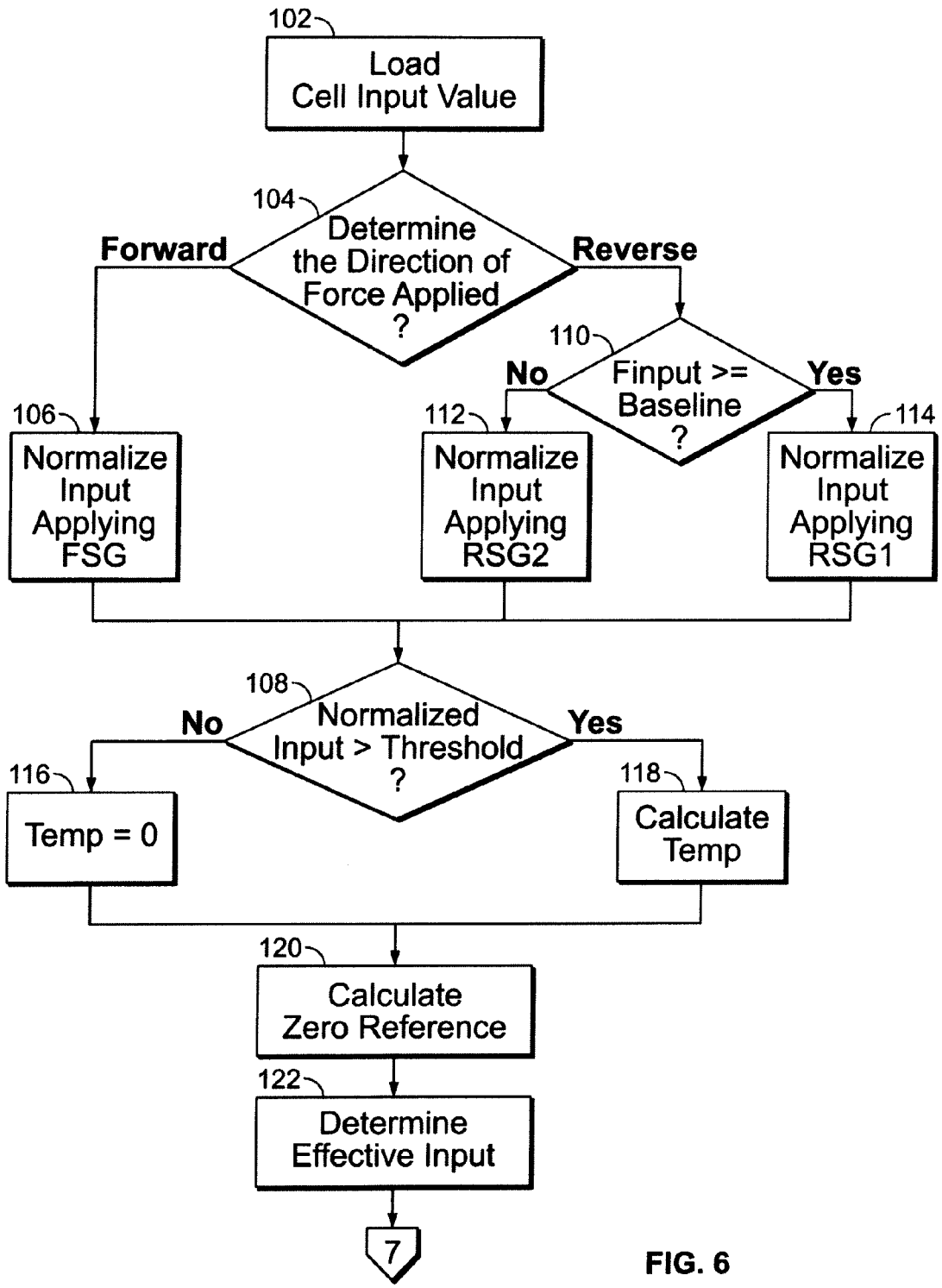
FIGS. 6-7 is a flow chart of the control algorithm used in determining the drive speed of the stretcher of FIG. 1.
Figure 7:
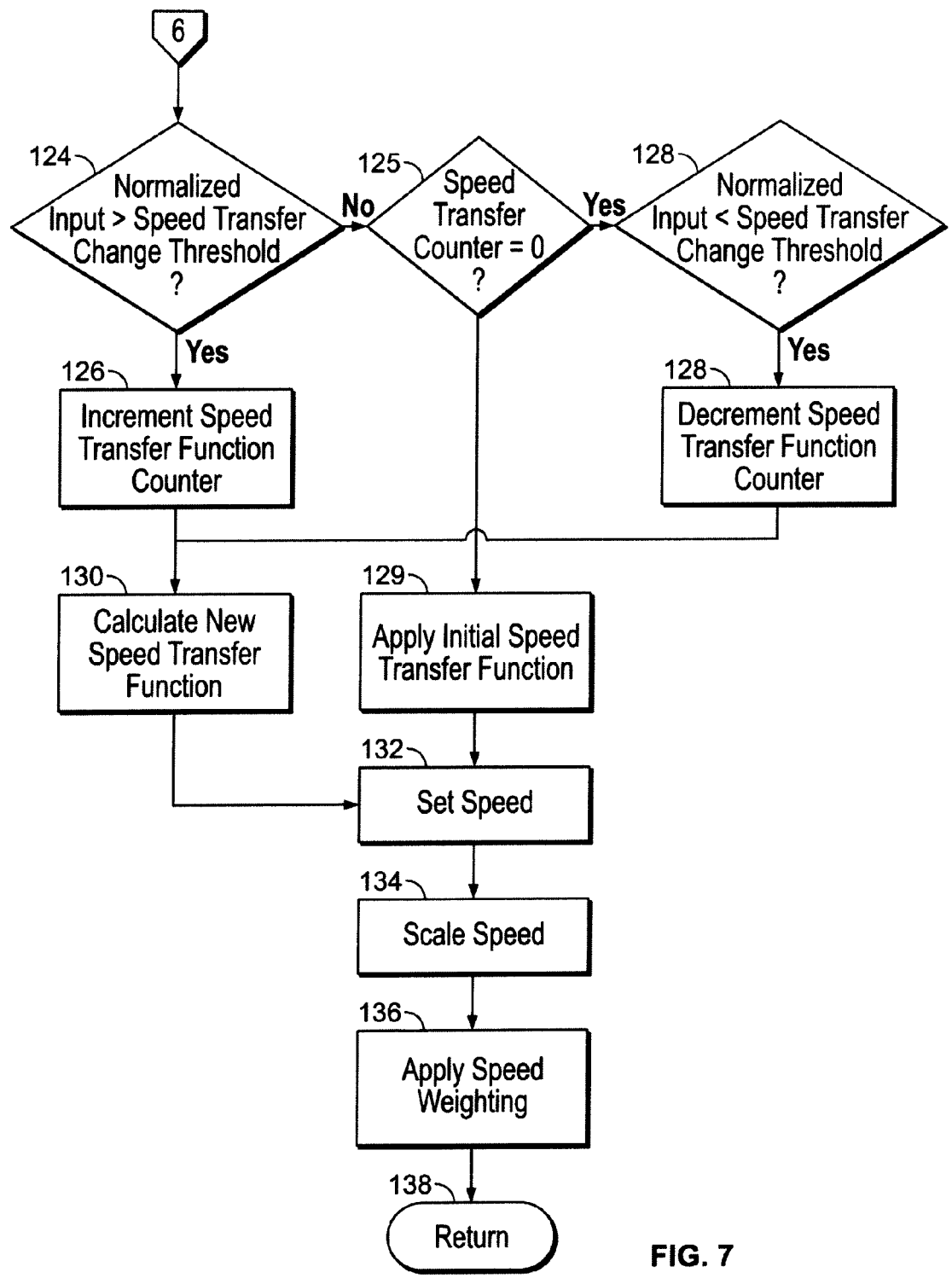

Controller 30 controls the operation of drive motor 42 under software control. A control routine 100 shown in FIGS. 6-7 represents an illustrative approach in which the input force applied to a user interface 34 is considered in determining the speed at which drive motor 42 is driven to propel the stretcher 10 along the floor. The operation of the software control is shown in a generalized form in FIG. 9. In a generalized embodiment 210, the control system receives a user input force at step 200. The user input force is applied to transfer function at step 202. The transfer function is used to calculate a speed at step 204. The speed calculated is output as a signal to the motor at step 206. The speed calculation at step 204 is fed back to the transfer function at step 202 such that the transfer function is a function of the previous speed calculation.

More specifically, a force applied to handle 48 of user interface 34 in the direction of arrow 170 acts on a load cell. The analog signal from the load cell 52 is processed by an analog-to-digital (A/D) converter within controller 30 and converted to a digital signal having a range of counts between 0 and a Full Range. In the illustrative embodiment, the A/D is an 8-bit device with a Full Range value of 255. For the remainder of this disclosure, the terms Full Range, Half Range, and Quarter Range will be used as generalizations to describe the operation of algorithms used to determine an output speed value which is output to the motor 42 to establish the motor 42 speed. It should be understood that other devices which have greater or lesser ranges may be employed depending on the application and the appropriate counts may be substituted. At a Half Range count in the illustrative embodiment, the load cell 52 is at a steady state condition in which no force is being applied and load cell 52 is undeflected. If a force is applied to handle 48 in the direction of arrow 172, the A/D signal will be between 0 and Half Range counts with the maximum force sensed corresponding to 0 counts. While a greater force may be applied, 0 counts corresponds tot the maximum value sensed by the load cell 52. The maximum force in the direction of arrow 170 results in Full Range counts.

The value of the deflection of the load cell 52 is received as an input at step 102 of control routine 100 at step 104. A comparison is made between the current load cell 52 reading and the most recent reading to determine the direction of application of the force applied, denoted as $F_{input}$. As used in the remainder of this disclosure, $F_{input}$ is a digital count which corresponds the deflection of the load cell 52. $F_{input}$ will always be a whole number from 0 up to Full Range. If $F_{input}$ are is a forwardly applied force, i.e. in the direction of arrow 170, then control routine 100 advances to step 106. The direction of $F_{input}$ is determined to be forward if the most recent value of $F_{input(n-1)}$ was forward and $F_{input(n)}$ is now greater than or equal to the previous value of $F_{input(n-1)}$. Also, the direction of $F_{input(n)}$ is determined to be forward if the current value of $F_{input(n)}$ is greater than the previous value, $F_{input(n-1)}$. Thus, while a reading may be less than Half Range counts, a user may be applying force in the direction of arrow 170. Stated another way, if the user has been pulling on the handle in the direction arrow 172, but reduces the force at which handle 48 is being pulled, control routine 100 will determine that the direction of the force applied, $F_{input}$, is forward. Similarly, if the direction of $F_{input}$ has been in reverse $F_{input(n)}$ will be determined to continue to be reverse if $F_{input(n)}$ is less than $F_{input(n-1)}$. At step 106, $F_{input}$ is normalized according to Equation 1.

$$F_{normalized} = (F_{input} * \text{Full Range}) / F_{SG} \qquad (1)$$

In Eq. 1, $F_{normalized}$ is the normalized forward force which is determined by taking the counts of the force read by the load cell 52, $F_{input}$ multiplied by Full Range of the load cell 52 and dividing that value by a strain gauge normalization constant, $F_{SG}$, for the forward direction. In the illustrative embodiment, $F_{SG}$ is equal to 207. It should be understood that $F_{SG}$ may be set to any of a number of values depending on the response characteristics of the system including the load cell 52.

If it is determined that $F_{input}$ is being applied in a reverse direction at step 104, then the control routine 100 makes an additional determination as to which direction the $F_{input}$ is applied relative to the baseline of Half Range counts at step 110. If the reading of $F_{input}$ is greater than Half Range counts, $F_{normalized}$ is calculated at step 112 of control routine 100 according to Equation 2.

$$F_{normalized} = [\text{Full Range} * (F_{input} - \text{Half Range})] / R_{SG2} \qquad (2)$$

In Eq. 2, $F_{normalized}$ has a gain applied based on the deviation of $F_{input}$ from the baseline of Half Range counts. In the illustrative embodiment a strain gauge normalization constant for the reverse direction, $R_{SG2}$ is equal to 207. $F_{input}$ is measured relative to the baseline and determined to be less than the baseline, thereby indicating that the user is applying $F_{input}$ in the direction opposite arrow 170 with sufficient force to indicate that the user is attempting to cause the patient-support apparatus 10 to travel in a reverse direction.

If it is determined at decision step 110 that $F_{input}$ is in a direction opposite arrow 170 but that the $F_{input}$ is not below Half Range counts then $F_{normalized}$ is calculated according to Equation 3 at step 114.

$$F_{normalized} = (\text{Half Range} * (\text{Half Range} - F_{input})) / (R_{SG1} + \text{Half Range}) \qquad (3)$$

By applying Equation 3, control routine 100 addresses a condition in which the user is attempting to slow the forward speed of the patient-support apparatus 10, but has not yet applied sufficient force to indicate a need to reverse the direction of the patient-support apparatus 10. In the illustrative embodiment a second strain gauge normalization constant for the reverse direction, $R_{SG1}$ is set to a value of 81.

Figure 8:
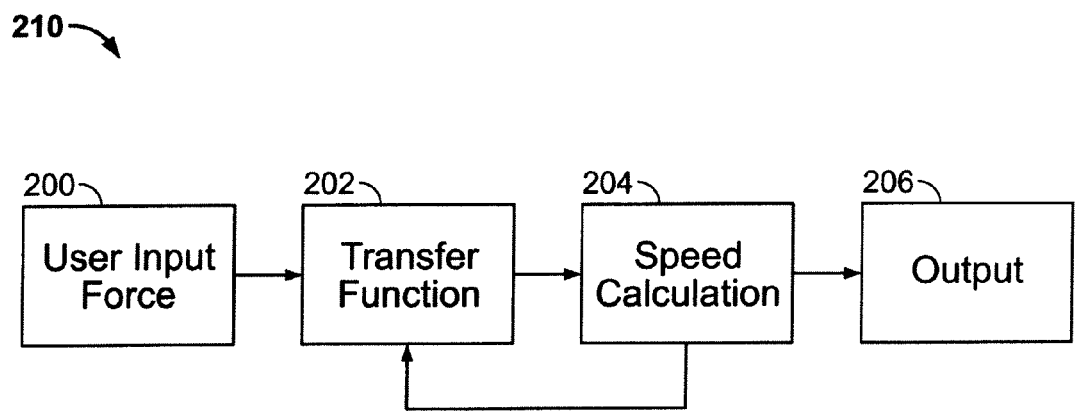
FIG. 8 is a graph of a normalization curve applied to user inputs according to the present disclosure.

Once a value of $F_{normalized}$ has been established, the value of $F_{normalized}$ is compared to a threshold of Quarter Range counts at step 108. If $F_{normalized}$ is less than or equal to Quarter Range counts, then control routine 100 sets a variable called temp to a value of 0 at step 116. The variable temp is used to calculate a zero reference force, $F_{zero\ ref}$ which is used to establish a proportional response to $F_{input}$. As will be described in further detail below, the proportional response changes as $F_{input}$ increases in magnitude such that the system is more responsive to incremental changes in $F_{input}$ at higher absolute values of $F_{input}$. A graph of the relationship between $F_{normalized}$ and $F_{input}$ is shown in FIG. 8.

If $F_{normalized}$ is greater than Quarter Range counts, then temp is calculated at step 118 using Equation 4 which establishes a factor applied to the last output of control routine 100, $Spd_{out\ previous}$, when calculating the value of $F_{zero\ ref}$ in Equation 5.

$$\text{temp}=(((F_{normalized}-\text{Quarter Range})*\text{Quarter Range})/(\text{Full Range}-\text{Quarter Range})) \quad (4)$$

Figure 9:
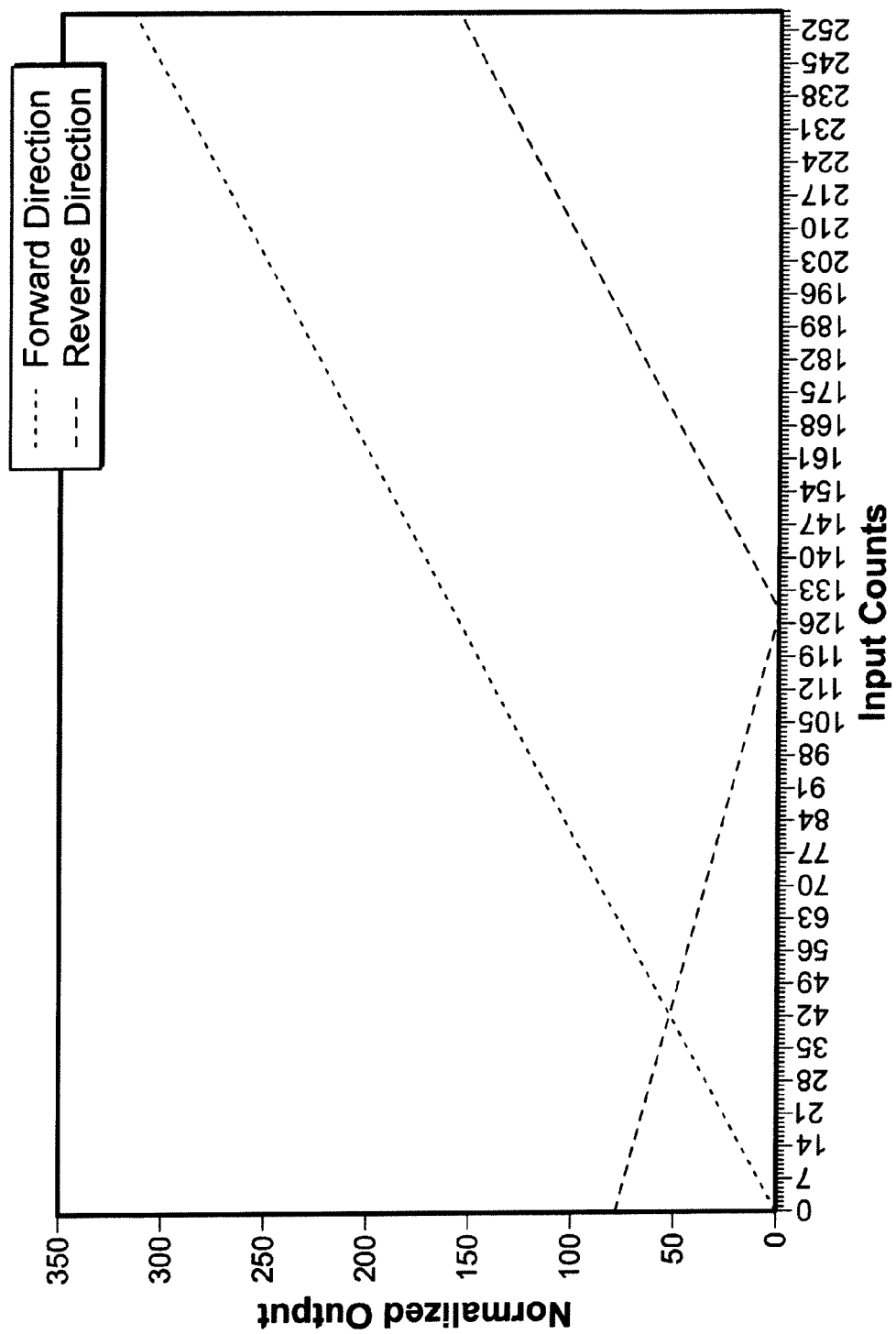
FIG. 9 is a graphical representation of the operation of the control system of the present disclosure.

Once temp is determined, the value of $F_{zeroref}$ is calculated at step 120. $F_{zeroref}$ is dependent on both $F_{normalized}$ and the previous output of control routine 100, $Spd_{outprevious}$ thereby making the calculation of the output of control routine 100 dependent on the previous output of control routine 100 as depicted in FIG. 9. The relationship between the previous output of control routine 100 is represented in Equations 5-8.

$$F_{zeroref}=(\text{Half Range}-((\text{temp} \times Spd_{outprevious}))/K_{SG} \quad (5)$$

At step 122, control routine 100 determines an effective force applied by the user by applying Equation 6. In Equation 6, the effective force represented by $F_{eff}$ is calculated by subtracting the zero reference force, $F_{zeroref}$, from the normalized input force, $F_{normalized}$, and multiplying the difference by a ratio of 4/3. The application of $F_{zeroref}$ helps to vary the responsiveness of the control routine 100 depending on the speed output value the system is operating under. There is a need to vary the responsiveness based on the speed at which the patient-support apparatus 10 is apparently moving as the user has to coordinate the force applied with the relative movement between the user and the patient-support apparatus 10.

$$F_{eff}=(4/3) \times (F_{normalized}-F_{zero\ ref}) \quad (6)$$

A preliminary speed output value, $Spd_{current}$, is determined based on a speed transfer function $f_{Spd}(t_n)$ at step 132. The speed transfer function $f_{Spd}(t_n)$ may be adjusted if the $F_{normalized}$ is greater or less than a speed transfer change threshold. If $F_{normalized}$ is persistently greater than the speed transfer change threshold, then $f_{Spd}(t_n)$ will continued to be adjusted making the controller more responsive. If $f_{Spd}(t_n)$, drops below the threshold, then $f_{Spd}(t_n)$ will be adjusted down to the initial condition as described below.

The speed transfer change threshold is compared to the $F_{normalized}$ value at step 124 of control routine 100. In the illustrative embodiment, the speed transfer function change threshold is set to 235 counts. It should be understood that the speed transfer change threshold may be set to any of a number of values of depending on the use conditions. If $F_{normalized}$ does not exceed the transfer change threshold, then a value of a speed transfer function counter, $Counter_{TF}$ is evaluated at step 125. If $Counter_{TF}$ is equal to zero, then an initial speed transfer function value is applied at step 129. In the illustrative embodiment, $f_{Spd}(t_1)$ is set to a value of 55 in both the forward and reverse directions.

If $F_{normalized}$ exceeds the threshold, transfer function counter, $Counter_{TF}$, is incremented and the speed transfer function, $f_{Spd}(t_n)$, is calculated according to Equation 7. If $F_{normalized}$ does not exceed the threshold, speed threshold counter, $Counter_{TF}$, is decremented and the current speed transfer function, $f_{Spd}(t_n)$ is calculated at step 130 according to Equation 7.

$$f_{Spd}(t_n)=((f_{Spd}(t_1)+(100-f_{Spd}(t_1)))*(Counter_{TF}-10))/(\text{Count Change}_{max}-10) \quad (7)$$

In Equation 7 $f_{Spd}(t_1)$ is an initial speed transfer function value, $Counter_{TF}$ is the current value of a speed transfer function counter, and Count Change$_{max}$ is the maximum the speed transfer function counter changes. In the illustrative embodiment, in either the forward or reverse direction, the maximum that the $Counter_{TF}$ will change is 70 counts. In the illustrative embodiment, control routine 100 is called every 10 milliseconds. In the illustrative embodiment, if the $Counter_{TF}$ is being incremented, it increments by 1 count once every 10 cycles through the control routine. Similarly, in the illustrative embodiment, if the $Counter_{TF}$ is being decremented, it decrements by 1 count every cycle. In this way, the speed transfer function is more responsive to decreases in value of $F_{input}$ input and less responsive to increases.

Once the current speed transfer function, $f_{Spd}(t_n)$, is calculated, the current speed request, $Spd_{current}$, is calculated by multiplying the speed transfer function, $f_{Spd}(t_n)$, by the effective applied force, $F_{eff}$, at step 132 of control routine 100. Step 132 applies Equation 8 shown below.

$$Spd_{current}=f_{Spd}(t_n) \times F_{eff} \quad (8)$$

Up to step 132, control routine 100 has filtered and compensated the input signal from the load cell 52 in the form of $F_{input}$ to determine the $Spd_{current}$ to be output to the motor. However, it has been determined that the actual output to the motor 42 should be scaled based on the direction of travel and certain performance characteristics of the device 24. For example, while the full scale reverse speed should not have the same magnitude as the full scale forward speed because a user cannot walk backwardly as fast as forwardly. In addition, a scaling factor provides for various top end speeds depending on the application in which a particular patient-support apparatus may be used. A patient-support apparatus which is used primarily for transport such as a stretcher, for example, may be scaled to have a higher forward speed. A patient-support apparatus used primarily for an acutely ill patient such as a critical care bed, for example, may be scaled to have a relatively low forward speed. The scale factors $Max_{forward}$ and $Max_{reverse}$ are programmable factors within the control routine 100 which may be used to scale the response of the motor to the $F_{input}$ based on the use environment in which the patient-support apparatus is configured to operate. If the $F_{input}$ is in forward, the scaled speed, $Spd_{scaled}$, is calculated at step 134 according to Equation 9. If the $F_{input}$ is in reverse, then the scaled speed, $Spd_{scaled}$, is calculated according to Equation 10.

$$Spd_{scaled}=Max_{forward}*Spd_{current} \quad (9)$$

$$Spd_{scaled}=Max_{reverse}*Spd_{current} \quad (10)$$

While the calculation of the scaled speed, $Spd_{scaled}$, is effective to limit the maximum range of the speed output value, the response of the control routine 100 to changes in speed varies as the speed changes. For example, as the speed output value, $Spd_{out\ previous}$, increases, the weighting of the new speed is reduced so that larger proportions of the previous speed output value, $Spd_{out\ previous}$, are weighted into the calculation of a new speed output value, $Spd_{out\ current}$. $Spd_{out\ current}$ is calculated according to Equation 11 at step 136 with the value of two weighting factors, $Weight_{new\ speed}$ and $Weight_{Old\ Speed}$ varying depending on the value of $Spd_{out\ current}$.

$$Spd_{out\ current} = (Weight_{new\ speed} * Spd_{scaled}) + (Weight_{Old\ Speed} * Spd_{out\ previous}) \qquad (11)$$

In all cases, the proportion of $Weight_{new\ speed}$ and the proportion of $Weight_{Old\ Speed}$ sum to a value of 1. At lower values of $Spd_{out\ current}$ the ratio of $Weight_{new\ speed}$ to $Weight_{Old\ Speed}$ may be 1:5 in the illustrative embodiment. At the highest value of $Spd_{out\ current}$, the ratio may be as small as 1:13. The weighting of the new speed to the old speed tends to dampen the response to changes in speed so that the system does not over-respond to user inputs because the user and patient-support apparatus 10 are both moving.

Although certain illustrative embodiments have been described in detail above, variations and modifications exist within the scope and spirit of this disclosure as described and as defined in the following claims.

The invention claimed is:

1. A control system for a self-propelled patient-support apparatus comprising
   a user input device,
   a motor for driving a wheel over a floor, and
   a controller including a processor and a memory device including instructions that, when executed by the processor, (i) monitor the user input device to determine a speed input request from a user, (ii) determine a desired direction of movement of the patient-support apparatus across the floor, (iii) normalize the speed input request, (iv) compare the normalized speed input request to a threshold value, (v) calculate an effective speed input value by evaluating a current speed input request and a previous speed output value, (vi) apply a speed transfer function to the effective speed input value to determine a current raw speed output value, (vii) scale the current raw speed output value based on the desired direction of movement to determine a current scaled speed output, (viii) weight the current scaled speed output with the previous speed output value to determine a current speed output value to transmit to the motor.

2. The control system of claim 1, wherein the memory device further includes instructions that normalize the speed input request based on a desired direction of travel of the patient-support apparatus.

3. The control system of claim 1, wherein the memory device further includes instructions that normalize the speed input based on the value of the speed input request compared to a value of a previous speed input request.

4. The control system of claim 1, wherein the memory device further includes instructions that normalize the speed input based on the value of the speed input request as compared to a condition in which there is no speed input request.

5. The control system of claim 1, wherein the memory device further includes instructions that apply a strain gage constant to normalize the speed value request.

6. The control system of claim 1, wherein the speed transfer function may vary over time.

7. The control system of claim 1, wherein the speed transfer function is calculated based on the normalized speed input request and a previous speed output value.

8. The control system of claim 1, wherein the memory device further includes instructions that (ix) vary the speed transfer function if the normalized input exceeds a transfer function change threshold.

9. The control system of claim 1, wherein the scaling of the speed is based on an intended use environment of the particular patient-support apparatus.

10. The control system of claim 1, wherein the weighting of the current scaled output speed value decreases as the value of the previous speed output value increases.

11. The control system of claim 1, wherein the user input device comprises a load cell.

12. The control system of claim 1, wherein the user input device comprises an enable switch.

13. A patient-support apparatus comprising
    a frame,
    a drive mechanism coupled to the frame and configured to move the patient-support apparatus across a floor, the drive mechanism including a drive wheel and a motor to drive the wheel,
    a controller coupled to the motor, and
    a user input coupled to the controller and configured to provide an input indicative of the speed and direction a user wishes to move the patient-support apparatus,
    wherein the controller includes a processor and a memory device including instructions that, when executed by the processor, (i) monitor the user input device to determine a speed input request from a user, (ii) determine a desired direction of movement of the patient-support apparatus across the floor, (iii) normalize the speed input request, (iv) compare the normalized speed input request to a threshold value, (v) calculate an effective speed input value by evaluating a current speed input request and a previous speed output value, (vi) apply a speed transfer function to the effective speed input value to determine a current raw speed output value, (vii) scale the current raw speed output value based on the desired direction of movement to determine a current scaled speed output, (viii) weight the current scaled speed output with the previous speed output value to determine a current speed output value to transmit to the motor.

14. The patient-support apparatus of claim 13, wherein the drive mechanism further includes a motor controller configured to receive the current speed output value and to power the motor based on the current speed output value.

15. A method of controlling the speed and direction of travel of a self-propelled patient-support apparatus including a variable user input device configured to receive a user input indicative of the direction and speed of travel, the method comprising the steps of
    monitoring the variable user input device to determine a speed input request from a user,
    determining a desired direction of movement of the patient-support apparatus,
    normalizing the speed input request,
    comparing the normalized speed input request to a threshold value,
    calculating an effective speed input value by evaluating a current speed input request and a previous speed output value,
    applying a speed transfer function to the effective input to determine a current raw speed output value,
    scaling the current raw speed output value based on the desired direction of movement to determine a current scaled speed output, and weighting the current scaled speed output with the previous speed output value to determine a current speed output value to transmit to a motor.

16. The method of claim 15, wherein the weighting of the current scaled output speed value decreases as the value of the previous speed output value increases.

17. The method of claim 15, wherein the step of applying a speed transfer function applies a speed transfer function that varies based on the normalized speed input request and the value of a previous speed output value.

18. The method of claim 15, wherein the step of normalizing the speed input normalizes the speed input based on the value of the speed input request and the value of a previous speed input request.

19. The method of claim 15, wherein the step of normalizing the speed input normalizes the speed input based on the value of the speed input request compared to a condition in which there is no speed input request.

20. The method of claim 15, wherein the step of normalizing the speed input normalizes the speed input based on a strain gage constant.

21. The method of claim 20, wherein the strain gage constant varies depending on the determined desired direction of movement of the patient-support apparatus.

* * * * *